(12) United States Patent
Männer et al.

(10) Patent No.: US 6,579,461 B2
(45) Date of Patent: Jun. 17, 2003

(54) METHOD FOR PREPARING OR PURIFYING AQUEOUS SOLUTIONS OF A TERTIARY AMINO-OXIDE

(75) Inventors: Johann Männer, Weyregg (AT); Rudolf Emeder, Seewalchen (AT); Christian Hager, Seewalchen (AT); Franz Nussbaumer, Vöcklamarkt (AT); Thomas Endl, Vöcklabruck (AT); Johannes Kneissl, Weyregg (AT)

(73) Assignee: Lenzing Aktiengesellschaft, Lenzing (DE)

( * ) Notice: Subject to any disclaimer, the term of this patent is extended or adjusted under 35 U.S.C. 154(b) by 112 days.

(21) Appl. No.: 09/804,911

(22) Filed: Mar. 13, 2001

(65) Prior Publication Data

US 2001/0045394 A1 Nov. 29, 2001

Related U.S. Application Data

(63) Continuation of application No. PCT/AT99/00222, filed on Sep. 14, 1999.

(30) Foreign Application Priority Data

Sep. 15, 1998 (AT) .............................................. 1548/98

(51) Int. Cl.⁷ ............................ C02F 1/24; C08J 11/02; D01F 13/02

(52) U.S. Cl. ....................... 210/703; 210/669; 210/704; 210/806; 564/297; 564/298; 264/37.2; 264/187

(58) Field of Search .................................. 210/703, 704, 210/806, 712, 669; 564/297, 298; 264/37.2, 187

(56) References Cited

U.S. PATENT DOCUMENTS

| | | | |
|---|---|---|---|
| 3,447,939 A | * | 6/1969 | Johnson |
| 5,773,655 A | | 6/1998 | Mülleder et al. ............ 564/298 |
| 5,858,285 A | | 1/1999 | Manner et al. ............. 264/37.2 |
| 5,904,818 A | | 5/1999 | Kalt et al. .............. 204/157.71 |

FOREIGN PATENT DOCUMENTS

| | | | |
|---|---|---|---|
| DE | 3900731 | | 7/1990 |
| WO | 9707268 | | 2/1997 |
| WO | 00/15887 | * | 3/2000 |

* cited by examiner

*Primary Examiner*—Thomas M. Lithgow
(74) *Attorney, Agent, or Firm*—Baker Botts L.L.P.

(57) ABSTRACT

The invention relates to a process for the reprocessing respectively purification of aqueous solutions of a tertiary amine oxide, particularly of process waters, e.g. used precipitation baths, which occur during the production of cellulosic moulded bodies, comprising the separation of turbidifying agents and solid impurities from the solution. The process in accordance with the invention is characterised in that the turbidifying agents and impurities are at least partly separated by means of a flotation process.

8 Claims, No Drawings

METHOD FOR PREPARING OR PURIFYING AQUEOUS SOLUTIONS OF A TERTIARY AMINO-OXIDE

This is a continuation of application Ser. No. PCT/AT99/00222 filed Sep. 14, 1999, which is incorporated by reference herein. PCT/AT99/00222 was not published in English.

The invention relates to a process for purifying aqueous solutions of a tertiary amine oxide, particulary for process waters which occur during the production of cellulosic moulded bodies, e.g. used precipitation baths.

In recent decades intensive efforts have been undertaken to find alternative more ecologically friendly processes to the well known viscose process for the production of cellulosic fibres due to the environmental problems associated with the former. In the recent past one possibility emerged which would appear to be of particular interest: to dissolve cellulose in an organic solvent without the formation of a derivative and to extrude moulded bodies from this. Fibres spun from solutions of this kind were given the generic name Lyocell from BISFA (The International Bureau for the Standardisation of Man-Made Fibres) whereby a mixture of an organic chemical and water is understood by an organic solvent. Moreover, fibres of this kind are also known under the term of "solvent-spun fibres".

It has turned out that especially a mixture of a tertiary amine oxide and water is excellent as an organic solvent for the production of Lyocell fibres respectively other moulded bodies. In this respect mainly N-methyl-morpholine-N-oxide (NMMO) is used as the amine oxide. Other suitable amine oxides are disclosed in EP-A 0 553 070. Processes for the production of cellulosic moulded bodies from a solution of cellulose in a mixture of NMMO and water are for example disclosed in U.S. Pat. No. 4,246,221 or in PCT-WO 93/19230. Here the cellulose solution is extruded from a spinneret, stretched in an air gap and precipitated from the solution into an aqueous precipitation bath. This process is described in the following as the "amine oxide process" or the "Lyocell process" whereby in the following the abbreviation "NMMO" stands for all tertiary amine oxides which can dissolve cellulose. Fibres manufactured in accordance with the amine oxide process are characterised by their high fibre strength in the conditioned and wet state, a high wet modulus and a high loop strength.

The cellulose is precipitated from the solution into an aqueous spin bath. The spin bath accumulates NMMO. The content of NMMO in the process waters (e.g. washings) which occur in the spin baths as well as in other parts of the amine oxide process thereby equals up to 30 weight percentage. For the economy of the amine oxide process it is of decisive importance that the NMMO is almost completely recovered and recycled.

At the same time as the NMMO, colourless to strongly discoloured decomposition products from the amine oxide process accumulate in the spin bath, which can on the one hand impair the quality of the moulded bodies and can on the other hand represent a safety risk since NMMO tends to produce strong exothermal decomposition reactions in certain conditions. These substances have to be removed prior to concentrating from the aqueous solution of the amine oxide.

Thus the solutions of amine oxide mostly contain inorganic cations and anions such as cations of sodium, calcium and magnesium respectively chloride, sulphate, etc., which stem in part from the pulp used in the process for the production of cellulosic moulded bodies and on the other hand from other substances used or formed in the process. These ions accumulate at the evaporation and concentrating stage of the solutions to concentrated aqueous solutions of amine oxide which can again be used in the process and subsequently lead to precipitations and incrustations in the evaporation plant.

Likewise metal ions and metal particles which can also originate from the pulp used as well as from the rubbing of the metallic apparatus parts used in the process accumulate in the solutions. It is well known that these metallic parts in solutions of cellulose in aqueous amine oxides can lead to what are often intense decomposition reactions both of the amine oxide and of the cellulose.

Dyestuffs which for example originate from the decomposition of compounds used in the amine oxide process to stabilise the cellulose solution, from substances accompanying the pulp used and in particular from decomposition reactions on behalf of the amine oxide used, likewise impair the execution of the amine oxide process and in particular the quality of the cellulosic moulded bodies produced according to this process.

Moreover, organic anions are located in the solutions which originate for example from decomposition reactions of the tertiary amine oxide and the cellulose.

Moreover, it was determined that unwanted biological substances can also form in the process waters of the amine oxide process, such as bacteria, yeast and fungi for example which form linings on the walls and lead to the blocking of pipelines etc.

The impurities could also be hemicelluloses such as pentosan for example which get into the NMMO circuit via the spin bath. But pigments and other impurities from washings and from the spin bath might also be located in the solution to be purified.

The unwanted substances listed here are in part dissolved and however partly also in the form of solid impurities and in colloidal form, as so-called turbidifying agents, in the solution.

To guarantee the economic efficiency and safety of the amine oxide process it is also necessary to completely separate solid impurities and turbidifying agents from the solution to be purified. In the following the term "turbidifying agents" can be used both for colloidal turbidifying agents as well as for other solid impurities.

In this respect PCT-WO 93/11287 recommends removing solid substances suspended in the solution from the solution prior to passing an ion exchanger. This can be done by means of filtration whereby only a coarse filtration is required according to PCT-WO 93/11287.

In PCT-WO 97/07268 it is revealed that a coarse filtration to separate the solid turbidifying agents is not sufficient. PCT-WO 97/07268, therefore, suggests an agglomeration of the turbidifying agents, in particular using a flocculent, followed by the removal of the turbidifying agents by means of filtration. The aqueous solution obtained in this respect is then brought into contact with an ion exchanger.

The endurances which can be obtained when operating the filter aggregates to separate the turbidifying agents are of particular relevance to the economic efficiency of a process to purify respectively reprocess aqueous NMMO solutions. An increase in the endurances of the downstream ion exchangers is, however, also important. In this respect it can be seen that there is still a need to increase these endurances or at the best to omit filter aggregates for the separation of solid impurities and turbidifying agents altogether.

This task is resolved by the process of the present invention which is characterised in that the turbidifying agents and impurities from the solution are at least partly separated by means of a flotation process.

Surprisingly it was shown that the turbidifying agents described above of different origin can be separated from the aqueous solution of amine oxide outstandingly well with a flotation process.

It is well known that the principle of flotation is based on the adhesion of particles and agglomerates to gas bubbles in liquids. The particles sticking to the gas bubbles rise to the surface where a cushion of foam forms. This cushion of foam can be drawn off of the surface of the solution. In the event of the use of a flotation process to separate the turbidifying agents from the NMMO solutions to be purified from the amine oxide process it has been shown that the turbidifying agents can be very effectively removed from the solution and thus the service lives of the downstream aggregates e.g. of filtration aggregates and ion exchangers can be quite significantly prolonged.

One preferred embodiment of the process in accordance with the invention is that the turbidifying agents and impurities are separated by means of pressure relaxation flotation. However other flotation processes known to the expert, e.g. flotation in stirrer cells (with or without the supply of compressed air), flotation in compressed air cells (whereby the air is fed through porous walls), electro flotation or microflotation are possible.

One other preferred embodiment of the process in accordance with the invention is characterised in that turbidifying agents and impurities are agglomerated prior to flotation. This is preferably achieved by adding a flocculant to the aqueous solution prior to flotation.

As a flocculent the substances described in PCT-WO 97/07268 or bentonite respectively substance mixtures are suitable. These flocculants also act like collectors in the flotation process i.e. like auxiliary flocculating agents. The addition of auxiliary flocculating agents, such as frothers and regulating agents, is not as a rule necessary.

To completely separate the turbidifying agents and solid impurities the aqueous solution can be subjected to filtration after flotation. Methods and aggregates suitable for this are for example described in PCT-WO 97/07268.

Substantial quantities of aqueous amine oxide can still be located in the flotation concentrate (the drawn-off foam like part of the solution which contains the agglomerated turbidifying agents). This amine oxide is separated from the flotation concentrate in one preferred embodiment of the process according to the invention and led back to the aqueous solution.

To further purify the aqueous solution after separating the turbidifying agents and impurities preference is given to further purifying the solution by means of adsorption measures and/or ion exchange. Processes of this kind are described in e.g. EP 0 488 988 and PCT-WO 95/23827.

The process in accordance with the invention is suitable in particular for the reprocessing of process waters which occur in the amine oxide process. As described above it is very important here that the used NMMO solution is freed of all dissolved and undissolved impurities for renewed application in the amine oxide process. This can be done in an even better way by using a flotation process to separate turbidifying agents.

The solution purified in accordance with the process in accordance with the invention is preferably led back to the process for the production of cellulosic moulded bodies.

EXAMPLES

General Description of the Flotation Process Used:

In a suitable vessel air with a very fine bubble size (30 $\mu$m to 50 $\mu$m) is well distributed in the NMMO solution to be purified. The turbidifying agents, which are partly agglomerated e.g. by the prior addition of a flocculant, remain sticking to the air bubbles and rise to the surface of the liquid. A cushion of foam forms on the surface with which the agglomerated turbidifying agents are drawn off and can be removed in the form of flotation concentrate. The NMMO contained in the flotation concentrate can for example be recovered by means of centrifuging or pressing the flotation concentrate.

General Conditions of Pressure Relaxation Flotation:

NMMO concentration: 15–25%
Addition of flocculant: strongly cationic (e.g. Praestol BC853, manufacturer: Messrs. Stockhausen; A7112, manufacturer: Messrs. Stockhausen; Alzofix P9, manufacturer: Messrs. Trostberg)
Agglomeration time: 15–30 minutes
Amount of air: 20–30 l/m$^3$ liquid
Pressure: 4–5 bar It can be shown that in the process in accordance with the invention flotation auxiliary agents can be omitted.

Example 1

A contaminated aqueous NMMO solution which originates from the amine oxide process was subjected to flotation according to the conditions mentioned above. In the solution prior to and after the flotation process in each case the content of turbidifying agent (FTU-Formazin Turbidity Units—according to the measuring process described in PCT-WO 97/07268)—the content of solid substance (dry substance residue of a filtration through a membrane of 0.45 $\mu$m) and the filter value (gram filtered solution after three minutes filtration through a membrane of 0,45 $\mu$m) were determined.

The results obtained are listed in the following table:

|  | Turbidity (FTU) | Content of solids (mg/l) | Filter value (g filtrate after 3 minutes) |
| --- | --- | --- | --- |
| Solution prior to flotation | 22 | 676 | 35.4 |
| Solution after flotation | 3.1 | 6.4 | 246 |

It can be seen quite clearly that most of the turbidifying agents are removed from the solution using the flotation process in accordance with the invention.

If a flotation step to preclean the used NMMO solution is used in a pilot plant operating in a continuous fashion for the production of cellulosic moulded bodies according to the amine oxide process, the endurances of the downstream filtration aggregates can be raised by approximately 5 times thus it becomes possible to use smaller and, therefore, more favourably priced filtration aggregates.

What is claimed is:

1. A process for purifying aqueous solutions of a tertiary amine oxide produced during the production of cellulosic molded bodies, comprising separating turbidifying agents and solid impurities from the solution wherein the turbidifying agents and impurities are at least partly separated by means of a flotation process.

2. The process according to claim 1 wherein the turbidifying agents and impurities are separated using pressure relaxation flotation.

3. The process according to claim 1 wherein the turbidifying agents and impurities are agglomerated prior to flotation.

4. The process according to claim 3 wherein a flocculant is added to the aqueous solution prior to flotation.

5. The process according to claim 1, claim 2, claim 3 or claim 4 wherein the aqueous solution is subjected to filtration after the flotation process.

6. The process according to claim 1, claim 2, claim 3 or claim 4 wherein the aqueous amine oxide in the flotation concentrate is separated from the flotation concentrate and led back to the aqueous solution.

7. The process according to claim 1, claim 2, claim 3 or claim 4 wherein the aqueous solution is further purified after separating the turbidifying agents and impurities by measures selected from the group consisting of adsorption, ion exchange, and a combination of adsorption and ion exchange.

8. The process according to claim 1, claim 2, claim 3 or claim 4 for the purification of process waters which occur in the production of cellulosic molded bodies, comprising the step of returning the purified solution back to the process for the production of cellulosic molded bodies.

* * * * *